United States Patent [19]

Ramsey

[11] Patent Number: 4,602,148
[45] Date of Patent: Jul. 22, 1986

[54] THERMOPLASTIC FITTING ELECTRIC HEAT WELDING METHOD AND APPARATUS

[75] Inventor: Russel G. Ramsey, Holdenville, Okla.

[73] Assignee: Central Plastics Company, Shawnee, Okla.

[21] Appl. No.: 734,836

[22] Filed: May 16, 1985

[51] Int. Cl.$^4$ ............................................... H05B 1/02
[52] U.S. Cl. ..................................... 219/535; 219/497;
219/544; 156/272.2; 156/273.9; 285/292;
285/280; 264/272.11
[58] Field of Search ............... 219/492, 497, 494, 508,
219/522, 528, 535, 541, 544; 156/86, 272.2,
273.9, 274.2, 304.2, 379.6; 264/272.11–272.19,
294, 342 R; 285/21, 22, 286, 292, 369, 423;
425/393

[56] References Cited

U.S. PATENT DOCUMENTS

| | | | |
|---|---|---|---|
| 4,147,926 | 10/1979 | Stähli | 219/535 |
| 4,334,146 | 6/1982 | Sturm | 219/492 |
| 4,349,219 | 9/1982 | Sturm | 285/21 |
| 4,486,650 | 12/1984 | Bridgstock et al. | 219/544 |

*Primary Examiner*—M. H. Paschall
*Attorney, Agent, or Firm*—Laney, Dougherty, Hessin, Claro & Beavers

[57] ABSTRACT

A method and apparatus for electrically heat welding a thermoplastic fitting having an electric resistance heating element disposed therein whereby a regulated quantity of electric power is supplied to the heating element during the welding process and the making of a high quality weld is insured. In accordance with the method, a controlled electric power is supplied to the resistance heating element of the fitting. The initial magnitude of the current flowing through the heating element is sensed and compared with predetermined current levels for various sizes of fittings whereby the size of the fitting as well as the total time the controlled electric power should be supplied to the heating element of the fitting for the making of a high quality weld are determined. The magnitude of the current flowing through the heating element over the time the controlled electric power is supplied thereto is sensed at predetermined time intervals and compared with predetermined current levels for the size of fitting being welded to thereby determine if the welding process is proceeding abnormally at such time intervals. The electric power supplied to the heating element is terminated when it is determined that the welding process is proceeding abnormally or otherwise at the end of the total time determined to be required for the making of a high quality weld.

8 Claims, 4 Drawing Figures

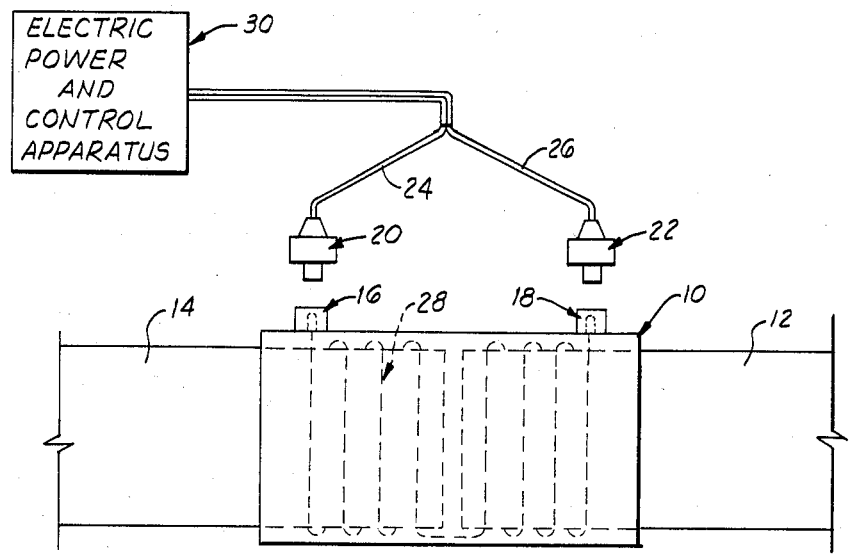
FIG. 1
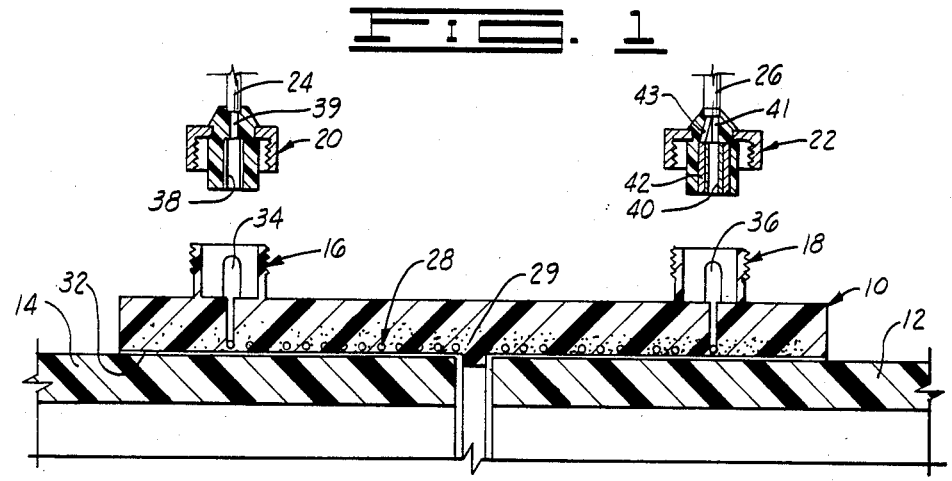
FIG. 2
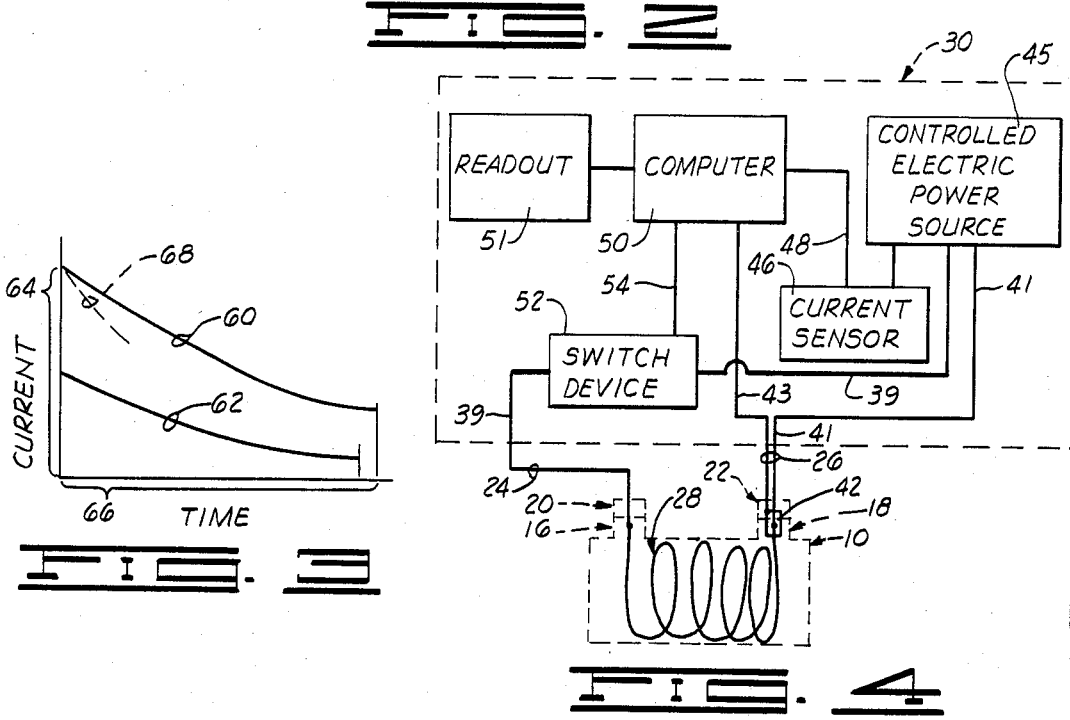
FIG. 3
FIG. 4

THERMOPLASTIC FITTING ELECTRIC HEAT WELDING METHOD AND APPARATUS

BACKGROUND OF THE INVENTION

1. Field of the Invention

The present invention relates to thermoplastic fitting electric heat welding methods and apparatus, and more particularly, but not by way of limitation to methods and apparatus for electrically heat welding thermoplastic fittings having electric resistance heating elements disposed therein to other plastic members such as plastic pipe joints.

2. Description of the Prior Art

Electric heat weldable fittings formed of thermoplastic material have been developed and used heretofore. Such fittings generally include an electric resistance heating element positioned adjacent the inside surfaces of the fitting which are to be welded to one or more other thermoplastic members such as plastic pipe sections. The electric resistance heating element is usually a coil of resistance wire disposed in the thermoplastic material of the fitting and is connected to electric contacts which are attached to an outside surface of the fitting. Examples of such electric heat weldable thermoplastic fittings are described in U.S. Pat. Nos. 4,147,926, issued Apr. 3, 1979, and 4,349,219, issued Sept. 14, 1982.

In welding the fitting to other plastic members positioned adjacent thereto, a source of electric power is connected to the contacts such as by electric cable and electric power is supplied to the resistance heating element of the fitting. The heating element heats the fitting and the adjacent thermoplastic members to temperatures which cause the thermoplastic materials of the fittings and adjacent members to be fused or welded together.

The quality of the weld which results is primarily dependent upon the correct quantity of electric power being supplied to the heating element of the fitting. If too little electric power is supplied, too little heating takes place and an inadequate low strength weld results. If too much electric power is supplied, the fitting and plastic members to which the fitting is welded can be deformed and overheated whereby a good weld does not result.

Various types of control and electric power generating apparatus have been utilized for supplying the electric power to electric heat weldable thermoplastic fittings. Initially, such apparatus was manually controlled by an operator and the quantity of electric power supplied to the heating element of the fittings was determined by visual observation of the fittings as they were welded. More recently, control apparatus has been developed whereby the operator manually programs the control apparatus to supply a predetermined quantity of electric power to the heating element of the fitting in accordance with the particular size of the fitting. Also, electric heat weldable fittings having heating coils and separate resistors disposed therein have recently been developed. The values of the resistors are chosen in accordance with the size of the fitting and the electric power to be supplied thereto. Electric power control apparatus is utilized with such fittings adapted to sense the values of the resistors and automatically supply a preset quantity of electric power to the heating coil in accordance therewith. Examples of such fittings and control apparatus are described in U.S. Pat. No. 4,486,650, issued Dec. 4, 1984.

While the fittings including separate resistors and the control apparatus which automatically supply the heating coils of the fittings with predetermined quantities of electric power have generally achieved good results, because each of the fittings must include one or more resistors in addition to the resistance heating element disposed therein, they are more expensive to produce than fittings with heating elements alone. In addition, the electric power control apparatus have not included satisfactory provision for preventing the burn-up of fittings and the fire hazard attendant thereto when fittings having shorted-out heating coils are encountered. Also, the predetermined quantities of electric power supplied the fittings have not always been accurate because the temperature of the fittings have not been taken into account. None of the prior electric control apparatus have been capable of detecting and accounting for defects such as bad electrical connections, misaligned pipe or other similar factors affecting the welding current or temperature.

By the present invention, a method and apparatus for electrically heat welding thermoplastic fittings are provided wherein the fittings do not require separate resistors or other devices for indicating the electric power required. In accordance with the present invention, the entire welding process of each fitting is comparatively monitored to insure the fitting and other aspects of the process are not defective and that the proper quantity of electric power is supplied to the fitting.

SUMMARY OF THE INVENTION

A method and apparatus for electrically heat welding a thermoplastic fitting having an electric resistance heating element disposed therein are provided. The method comprises the steps of connecting the fitting to a controlled electric power source whereby the resistance heating element thereof is supplied with controlled electric power; sensing the initial magnitude of the current flowing through the resistance heating element and comparing such magnitude with predetermined current levels for various sizes of fittings to thereby determine the size of the fitting being welded and the total time the controlled electric power should be supplied to the resistance heating element thereof to insure the making of a high quality weld; continuing to sense the magnitude of the current flowing through the resistance heating element over the time the controlled electric power is supplied thereto and comparing such magnitude at predetermined time intervals with predetermined current levels for the size of fitting being welded to thereby determine if the welding process is proceeding abnormally at such time intervals; and terminating the supply of electric power to the resistance heating element of the fitting when it is determined that the welding process is proceeding abnormally or otherwise at the end of the total time required for making a high quality weld.

It is, therefore, a general object of the present invention to provide thermoplastic fitting electric heat welding methods and apparatus.

A further object of the present invention is the provision of a method and apparatus for electrically heat welding thermoplastic fittings having resistance heating elements disposed therein whereby the quantity of electric power supplied to the heating element is automatically determined and accurately controlled.

A further object of the present invention is the provision of a method and apparatus for electrically heat welding thermoplastic fittings wherein the quality of the fitting is determined early in the welding process and the application of electric power to the fitting terminated if such fitting is defective.

Yet a further object of the present invention is the provision of a method and apparatus for electrically heat welding thermoplastic fittings wherein the initial temperature of the fitting is taken into account and the temperature of the resistance heating element is comparatively monitored along with the magnitude of the current flowing therethrough during the welding process to insure a high quality weld.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side view of an electric heat weldable thermoplastic sleeve having the ends of a pair of pipe sections inserted therein with the electric power and control apparatus of the present invention illustrated schematically in relation thereto;

FIG. 2 is an enlarged cross-sectional view of portions of the fitting, plastic pipe sections and electric power and control apparatus of FIG. 1;

FIG. 3 is a graph showing the current-time relationships of different fittings; and FIG. 4 is a schematic illustration of the electric power and control apparatus of the present invention connected to a thermoplastic fitting having a resistance heating element disposed therein.

DETAILED DESCRIPTION OF PREFERRED EMBODIMENTS

Referring now to the drawings and particularly to FIGS. 1 and 2, an electric heat weldable thermoplastic sleeve 10 is illustrated with the ends of a pair of thermoplastic pipe sections 12 and 14 inserted therein. The sleeve 10 includes a pair of electric contact connectors 16 and 18 attached thereto for receiving complementary electric contactors 20 and 22 attached to the ends of electric cables 24 and 26, respectively. The cables 24 and 26 are connected to an electric power and control apparatus, generally designated by the numeral 30, which will be described in detail hereinbelow.

As best shown in FIG. 2, the thermoplastic fitting 20 includes an electric resistance heating element 28 disposed therein adjacent portions of the interior surface 32 thereof. The resistance heating element 28 can take various forms, but preferably is a coil formed of electric resistance heating wire disposed in a spiral winding within the thermoplastic material forming the sleeve 10 adjacent the portions of the interior surface 32 which are to be welded to the exterior surfaces of the pipe sections 12 and 14. The opposite ends of the heating wire 28 are connected to upstanding electric contact pins 34 and 36 disposed within the connectors 16 and 18. As will be understood, the complementary connectors 20 and 22 of the electric power and control apparatus 30 are adapted for removable connection to the connectors 16 and 18 of the sleeve 10.

The connectors 20 and 22 include electric contact sockets 38 and 40, respectively, for engagement with the electric contact pins 24 and 36 of the connectors 16 and 18. The socket contact 38 is connected to a wire 39 extending through the cable 24 and the socket contact 40 is connected to a wire 41 extending through the cable 26. The connector 22 also includes a temperature sensing device 42 such as a thermister, RTD, or thermocouple positioned in heat conducting relationship with the socket contact 40 which is connected to a multiple lead wire 43 also extending through the cable 26. The device 42 senses the temperature of the contact pin 36 when the socket contact 40 is engaged with the pin 36. That is, when the connector 22 is connected to the connector 18 of the sleeve 10, the temperature sensing device 42 senses an initial temperature which is representative of the temperature of the entire sleeve 10. As electric power is supplied to the electric resistance element 28 which is connected to the pin 36, the device 42 senses the temperature thereof by way of the pin 36.

As will be described further hereinbelow, when the fitting 10 is to be fused or welded to the pipe sections 12 and 14, the connectors 20 and 22 attached to the cables 24 and 26 are removably connected to the connectors 16 and 18 of the sleeve 10 whereby an electric circuit is completed between the electric resistance heating element 28 of the fitting 10 and the electric power and control apparatus 30. The electric power and control apparatus 30 is activated to provide electric power to the heating element 28 which causes the heating element to heat the thermoplastic material forming the sleeve 10 and the thermoplastic material forming the ends of the pipe sections 12 and 14 inserted within the interior of the sleeve 10. The heating is continued until the thermoplastic material of the fitting 10 and pipe sections 12 and 14 soften and are fused together to form welds between the fitting 10 and the pipe sections 12 and 14.

Referring now to FIG. 4, the electric power and control apparatus 30 of the present invention is illustrated schematically connected to the heating element 28 of the sleeve 20 by way of the cables 24 and 26 and the connectors 16, 18, 20 and 22. The apparatus 30 includes a controlled electric power source 45 which is connected by means of the wires 39 and 41 extending through the cables 24 and 26 to the contact sockets of the connectors 20 and 22. The contact sockets are in turn connected to the contact pins of the connectors 16 and 18 of the sleeve 10 which are in turn connected to the heating element 28 of the fitting 10.

A current sensor 46 for sensing the current flowing from the power source 45 to the heating element 28 is electrically connected to the power source 45 with the output signal therefrom connected by a lead 48 to an electronic computer 50. The temperature sensing device 42, previously described, is also connected by the wire 43 attached thereto and extending through the cable 26 to the computer 50. A switch device 52 such as a TRICAC or SCR is provided in the circuit between the heating element 28 and the power source 45 which is operably connected to the computer 50 by a lead 54. The computer 50 includes a readout module 51 operably connected thereto for visually indicating various modes of operation of the apparatus 30 such as a shut-down due to a defective fitting, etc.

In operation of the apparatus 30 for electrically heat welding the thermoplastic fitting 10 by means of the electric resistance heating element 28 disposed therein, the connectors 20 and 22 are first connected to the connectors 16 and 18 of the sleeve 10. The computer 50 is then started which in turn closes the switch device 52 thereby completing the circuit between the controlled electric power source 45 and the heating element 28 by way of the wires 39 and 41 connected therebetween. The computer 50 senses the initial temperature of the fitting 10 by means of the temperature sensing device 42 and wire 43 connected thereto as well as the initial magnitude of the current flowing through the heating element 28 by means of the current sensor 46 and lead 48. The initial temperature and initial magnitude of the current are compared by the computer 50 with predetermined current levels for various sizes of fittings at various temperatures in the memory of the computer to determine the size of the fitting being welded and the total time the controlled electric power should be supplied to the heating element thereof to insure the making of a high quality weld.

Referring to FIG. 3, the current-time relationship during the making of a high quality weld for two different sizes of fittings using controlled electric power is illustrated graphically. The top curve, designated by the numeral 60, represents the welding process for a two-inch sleeve and the bottom curve, designated by the numeral 62, represents the welding process for a one-inch sleeve. As shown, the current levels are different for the different sizes of sleeve, and each size and type of electrically heat weldable thermoplastic fitting has a current-time relationship which is characteristic of that fitting when a high quality weld is formed using a proper quantity of controlled electric power.

The computer 50 includes such current-time relationship information for a variety of electric heat weldable thermoplastic fittings in the memory thereof whereby the computer 50 can make the comparisons described and identify the size of fitting being welded from the initial magnitude of current flowing through the heating element. Upon identification of the fitting, the computer determines the total time the controlled electric power should be supplied to the heating element for the making of a high quality weld from the information in memory and the initial temperature of the fitting. For example, referring to FIG. 3, if the initial magnitude of the current flowing through the heating element of a fitting is that designated by the numeral 64, the computer will determine that the fitting is a two-inch sleeve represented by the curve 60. The computer will also then determine from the curve 60 that the total time the controlled electric power should be supplied to the heating element for the making of a high quality weld is the time designated by the numeral 66.

The computer 50 continues to sense the magnitude of the current flowing through the heating element of the fitting being welded over the time the controlled electric power is supplied thereto and compares such magnitude at predetermined time intervals with predetermined current levels for the size of fitting being welded, i.e., for the two-inch sleeve of FIG. 3, the computer would compare the actual current level with the current levels of the curve 60 at frequent predetermined time intervals. As long as the sensed current levels are substantially the same as the current levels in memory for the size of fitting being welded, the computer continues the welding process to the total time determined to be required for the making of a high quality weld. If the sensed current levels deviate from the current levels in memory, as for example the deviation shown by the dashed line 68 of FIG. 3, the computer 50 determines the welding process is proceeding abnormally and terminates the welding process by turning off the electric power. The operator of the apparatus 30 is informed of the shutdown and the reason therefor by way of the readout 51.

The temperature of the resistance heating element of the fitting 10 being welded sensed by the temperature sensing device 42 is also monitored by the computer 50 throughout the welding process. The sensed magnitude of the temperature of the heating element is compared with predetermined temperature levels for the size of fitting being welded in the same manner as described above for the sensed current levels to determine the normality or the abnormality of the welding process as it proceeds and the reason for any abnormally found. For example, if the temperature and/or current levels are too high, a defective shorted-out heating element may be indicated.

As long as the welding process proceeds normally, it is allowed to continue to the end of the time determined to be required for the making of a high quality weld whereupon the computer 50 terminates the supply of electric power to the heating element of the fitting being welded by operation of the switch 52.

In order to facilitate the making of a high quality weld, alternating current is supplied to the heating element of the fitting being welded by the controlled electric power source 45 of the apparatus 30. The frequency of the alternating current is adjusted to that frequency which best causes the fitting being welded to vibrate as a result of the magnetic fields produced by the alternating current flowing through the heating element of the fitting. Such vibration facilitates and promotes the fusing of the softened thermoplastic materials of the fitting and other plastic members being welded thereto.

In order to concentrate the magnetic fields created by the alternating current and amplify the vibration produced thereby, conductive metallic material can be attached to or included in the weldable thermoplastic fittings. For example, as illustrated in FIG. 2, iron filings 29 can be suspended in the thermoplastic material forming the fitting 10.

Thus, the present invention is well adapted to carry out the objects and attain the ends and advantages mentioned as well as those inherent therein. While presently preferred embodiments of the invention have been described for purposes of this disclosure, numerous changes in the arrangement of steps and parts can be made by those skilled in the art, which changes are encompassed within the spirit of this invention as defined by the appended claims.

What is claimed is:

1. A method of electrically heat welding a thermoplastic fitting having an electric resistance heating element disposed therein whereby a predetermined regulated quantity of electric power is supplied to the heating element during the welding process and the making of a high quality weld is insured comprising the steps of:
   (a) connecting said fitting to a controlled electric power source whereby said resistance heating element of said fitting is supplied with controlled electric power;
   (b) sensing the initial temperature of said fitting;
   (c) sensing the initial magnitude of the current flowing through said resistance heating element of said fitting and comparing such magnitude with predetermined current levels for various sizes of fittings at said initial temperature of said fitting to thereby determine the size of said fitting being welded and the total time the controlled electric power should be supplied to said resistance heating element of said fitting to insure the making of a high quality weld;

(d) continuing to sense the magnitude of the current flowing through said resistance heating element of said fitting over the time said controlled electric power is supplied thereto and comparing such magnitude at predetermined time intervals with predetermined current levels for the size of fitting determined in step (c) to thereby determine if the welding process is proceeding abnormally at such time intervals; and (e) terminating the supply of electric power to said resistance heating element of said fitting when it is determined that said welding process is proceeding abnormally in step (d) or otherwise at the end of the total time required for the making of a high quality weld as determined in accordance with step (c).

2. The method of claim 1 which is further characterized to include the steps of:

comparing said initial temperature level with predetermined temperature levels for the size of fitting determined in step (c) to thereby determine the adjustment required, if any, in the total time the controlled electric power should be supplied to the resistance heating element of said fitting as a result of said initial temperature level; and changing the total time determined in accordance with step (c) in accordance with said adjustment.

3. The method of claim 2 which is further characterized to include the steps of:

sensing the magnitude of the temperature of said resistance heating element of said fitting over the time period said controlled electric power is supplied thereto and comparing such magnitude at predetermined time intervals with predetermined temperature levels for the size of fitting determined in step (b) to thereby determine if the welding process is proceeding abnormally at such time intervals; and terminating the supply of controlled electric power of said resistance heating element when it is determined that said welding process is proceeding abnormally as a result of such temperature comparisons.

4. The method of claim 1 wherein the current of said controlled electric power supplied to said resistance heating element of said fitting is alternating current.

5. The method of claim 4 wherein the frequency of said alternating current is at a level such that said fitting is caused to be vibrated by the magnetic fields produced thereby during said welding process.

6. A method of electrically heat welding a thermoplastic fitting having an electric resistance heating element disposed therein whereby a regulated quantity of electric power is supplied to the heating element during the welding process and the making of a high quality weld is insured comprising the steps of:

(a) connecting said fitting to a controlled electric power source whereby said electric resistance heating element of said fitting is supplied with controlled electric power;

(b) sensing the initial temperature of said fitting and the initial magnitude of the current flowing through said resistance heating element of said fitting and comparing such magnitude with predetermined current levels for various sizes of fittings at said initial temperature of said fitting to thereby determine the size of the fitting and the total time said controlled electric power should be supplied to said electric resistance heating element of said fitting to insure the making of a high quality weld;

(c) continuously sensing the temperature of said resistance heating element and the magnitude of current flowing therethrough over the time the controlled electric power is supplied to said heating element and comparing such temperature and current magnitude at predetermined time intervals with predetermined temperature and current levels for the size of fitting determined in step (b) to thereby determine if said welding process is proceeding abnormally at such time intervals; and (d) terminating the supply of electric power to said electric resistance heating element of said fitting when it is determined that said welding process is proceeding abnormally in step (c) or otherwise at the end of the total time required for the making of a high quality weld as determined in accordance with step (b).

7. The method of claim 6 wherein the current of said controlled electric power supplied to said electric resistance heating element is alternating current.

8. The method of claim 7 wherein the frequency of said alternating current is at a level such that said fitting is caused to be vibrated by the magnetic fields produced thereby during said welding process.

* * * * *

UNITED STATES PATENT AND TRADEMARK OFFICE
CERTIFICATE OF CORRECTION

PATENT NO. : 4,602,148
DATED : July 22, 1986
INVENTOR(S) : Russel G. Ramsey

It is certified that error appears in the above-identified patent and that said Letters Patent are hereby corrected as shown below:

Column 3, line 50, change "20" to --10--;

Column 3, line 68, change "24" to --34--;

Column 4, line 39, change "20" to --10--; and

Column 6, line 13, change "abnormally" to --abnormality--.

Signed and Sealed this

Eleventh Day of November, 1986

*Attest:*

DONALD J. QUIGG

*Attesting Officer*     *Commissioner of Patents and Trademarks*